United States Patent [19]

Lemonnier

[11] Patent Number: 5,413,925
[45] Date of Patent: May 9, 1995

[54] CARTRIDGE FOR FERMENTATION OF SUGAR-CONTAINING BEVERAGES

[75] Inventor: Jean Lemonnier, le Vesinet, France

[73] Assignee: Millipore S. A., Saint Quentin-En-Yvelines, France

[21] Appl. No.: 5,710

[22] Filed: Jan. 19, 1993

[30] Foreign Application Priority Data

Jan. 21, 1992 [FR] France ................... 92 00591

[51] Int. Cl.6 ............... C12N 11/04; C12N 11/08; C12G 1/06
[52] U.S. Cl. .................... 435/183; 435/180; 426/8; 426/15; 426/62
[58] Field of Search ............... 435/180, 182, 288; 99/321, 323.2, 323.3, 275; 426/7, 8, 11, 13, 15, 52, 592, 62

[56] References Cited

U.S. PATENT DOCUMENTS

| | | |
|---|---|---|
| 3,715,277 | 2/1973 | Dinelli et al. |
| 3,875,008 | 4/1975 | Yoshino et al. ............... 195/63 |
| 4,792,454 | 12/1988 | Lemonnier ............... 426/8 |
| 5,019,410 | 5/1991 | Pors et al. ............... 426/8 |
| 5,104,665 | 4/1992 | Fleet et al. ............... 426/15 |

FOREIGN PATENT DOCUMENTS 0138060 4/1985 European Pat. Off.

*Primary Examiner*—Donald E. Czaja
*Assistant Examiner*—Curtis E. Sherrer
*Attorney, Agent, or Firm*—Andrew T. Karnakis; Paul J. Cook

[57] ABSTRACT

The present invention describes a cartridge of hollow fibers intended principally for the refermentation in the bottle of sugar-containing wine according to the traditional so-called "champagne" method. The cartridge has a perforated tubular body in which are arranged microporous hollow fibers preferably hydrophilic and a few hydrophobic and which are folded in a U shape and which are filled with yeasts. The cartridge is of a size to be inserted in the neck of a bottle and allows refermentation to occur by ensuring the maintenance of an optimum exchange surface between the wine and the yeasts.

12 Claims, 3 Drawing Sheets

CARTRIDGE FOR FERMENTATION OF SUGAR-CONTAINING BEVERAGES

BACKGROUND OF THE INVENTION

The present invention relates to a device for the fermentation of drinks containing sugar and in particular the preparation of sparkling wine such as champagne by a second fermentation, or refermentation of a still wine in the bottle.

The traditional so-called "champagne" method consists of adding a "liqueur de tirage" containing sugar and the fermentation yeast necessary for the conversion of the sugar into carbon dioxide to still ordinary wine, which has already undergone a first alcohol fermentation. Bottling may be carried out before or after these additional stages.

The bottles are then corked using a hollow plastic stopper inserted into the neck of the bottle and sealed by crimping a metal cap. They are then generally stored horizontally "on slats" for a long period of time lasting from several months to several years in cedars where the temperature is kept constant, generally between 10 and 15° C. so that fermentation takes place with a corresponding rise in pressure or "bottle fermentation" in the bottles.

At the end of this long fermentation period, each bottle must be shaken individually several times in order to dislodge the fermentation deposit which might stick to the walls of the bottle. During this shaking period the bottles are also inclined then stored "on the point", that is to say inclined with the neck downwards, to facilitate the decanting of the yeasts and encourage the fermentation waste products to be deposited inside the hollow plastic stopper situated in the neck of the bottle.

Once shaking is completed, the bottles are transported vertically, with the neck downwards, and are plunged in a refrigeration brine bath maintained at about −20° C. in order to form, by freezing, a plug of frozen wine containing the fermentation yeast waste products.

The bottles then undergo a disgorging operation which consists of vertically placing the bottles with the thus frozen neck upwards and of decapping them, which causes, under the action of the pressure inside the bottle, the ejection of the plastic stopper together with the frozen plug containing the fermentation sediments.

The original level of the bottles is then restored by the addition of a "liqueur d'expedition" and the bottle is sealed with a permanent stopper which is generally made of cork.

The traditional so-called "champagne" method that has just been described requires a large workforce, in particular after fermentation when the bottles are shaken, an act often carried out by hand. This method involves a large surface area for storing the bottles on special racks and a rather long storage time which may be more than one month. In addition, the traditional method includes a stage of freezing the neck of the bottles, which is indispensable for the elimination of the yeasts.

Attempts have been made to try to remedy these drawbacks.

U.S. Pat. No. 4,792,454 assigned to Millipore Corporation, the parent company of the assignee of this application, describes a process for fermenting wine in the bottle according to the champagne method. This prior art process includes the introduction of a tubular filter cartridge into the neck of the bottle of wine which has had added to it the quantity of sugar necessary to obtain the desired final pressure of carbon dioxide. This cartridge has a perforated tubular body, externally coated with a hydrophilic filter membrane and a hydrophobic filter membrane and contains the yeasts necessary for the fermentation of wines containing sugar with release of carbon dioxide. The use of such a filter cartridge has the advantage of eliminating the need for a shaking stage which allowed the deposit of yeasts to be concentrated in the neck of the bottle, as well as the requirement of freezing the neck of the bottle, which allowed the plug containing the yeast residues to be frozen and ejected, since the yeasts are no longer in contact with the inside of the bottle. The technique described in this U.S. patent does, however, have certain drawbacks.

In fact, it has been observed that the rise in pressure of the carbon dioxide in wine bottles fitted with a cartridge according to the teachings of U.S. Pat. No. 4,792,454 required a longer time than that necessary for fermentation according to the traditional champagne method. Such an increase in the duration of bottle fermentation results in an unacceptable modification of the organoleptic properties of the wine which has undergone a second fermentation under these conditions.

Furthermore, during experiments carried out to identify the mechanisms involved during bottle fermentation according to the aforementioned U.S. patent, it was noted that the cartridge, filled with yeast and immersed in wine, quickly emptied itself of any liquid under the pressure of the carbon dioxide produced by the yeast. The gas thus accumulated inside the cartridge only escaped (in the form of bubbles) through the vent, constituted by the hydrophobic membrane, when the pressure was sufficient to overcome the forces of surface tension. This prior art filter cartridge therefore acts as a surface fermentor, in which only the yeasts in contact with the hydrophilic membrane are wetted by the wine and can therefore live and consume the sugar.

Furthermore, during the fermentation reaction, the yeasts which consume the sugar while producing mainly ethanol and carbon dioxide release energy in the form of heat. Hence the wine in contact with the yeasts is depleted of sugar and simultaneously its temperature is raised slightly by the fermentation reaction, and then it is replaced due to thermal convection by wine which is colder and richer in sugar.

In addition, the structure itself of the cartridge described in the U.S. patent mentioned above, where the surface of the membrane lined on the inside with yeasts acts as a heat generator, limits the convection currents due to its cylindrical shape and its bulkiness in the neck of the bottle.

SUMMARY OF THE INVENTION

In order to avoid these various drawbacks, the present invention is directed to an improved device the implementation of which uses the technique of microporous hollow fibers used essentially for the filtration of water or the dialysis of blood.

The microporous membrane having the hydrophobic portion can be made of polyolefin, a fluorocarbon resin, polyester, EVA, polyamide or the like. The hydrophilic microporous membrane can be made of cellulose, PVA, the above-mentioned hydrophobic membrane which is temporarily hydrophilized by alcohol or a surface-active agent, or the above-mentioned hydrophobic membrane which is permanently or semipermanently hydrophilized by one of a monomer and a polymer grafted on its surface or a hydrophilic polymer coated on the surface of the micropores of the membrane. It is preferred that the microporous membrane should prevent the passage of pyrogen or endotoxin therethrough. When the microporous membrane is made of polyolefin, it can prevent undesirable organic substances such as phtalic ester. The pore size, porosity and thickness of the microporous membrane are determined in accordance with a liquid to be filtered. Particularly, it is preferred that the microporous membrane should have a permeability of not less than $1/m^2$ min. under a water pressure of $1 \text{ kg/cm}^2$.

The improvement according to the present invention consists of a tubular cartridge having a perforated tubular body and one or more microporous elements retaining the yeasts causing fermentation of a beverage containing sugar with the release of carbon dioxide. The cartridge is characterized in that the retaining microporous element or elements are in the form of microporous hollow fibers which are arranged inside the tubular body and filled with the yeasts.

These fibers, which can be either folded in a U shape or be in the form of blind single strands inside the tubular body, can all be hydrophilic in the cartridge according to the invention. Also, either some of the fibers can be totally hydrophilic and some of them totally hydrophobic, or each of them can be partially hydrophilic and partially hydrophobic.

Such an improvement according to the invention not only allows the advantages connected with the use of a cartridge according to the previously mentioned U.S. patent to be retained but also includes the following additional advantages.

First of all, the increase in the porous exchange surface between the wine containing sugar and the inside of the hollow fibers in the cartridge according to the invention relative to the surface of the membranes of the cartridge described in U.S. Pat. No. 4,792,454 is of the order of 5 to 10 times greater, for a cartridge of the same size. It is thus that the total exchange surface of 50 U-shaped porous fibers arranged in a cartridge with a 12 mm internal diameter and 60 mm long is about 5 times larger. This surface, increased in this way to about 100 $cm^2$ exchange surface, corresponds to the surface of a free yeast deposit in a bottle, according to the traditional method.

Also, due to their shape and their being less bulky, the microporous hollow fibers favor, during the fermentation reaction, the formation of much stronger convection currents than in the case of the cartridge of the previously mentioned U.S. patent.

Furthermore, whereas the use of the cartridge described in U.S. Pat. No. 4,792,454 requires protection of the very fragile hydrophilic and hydrophobic membranes welded to the outside of the perforated tubular body by a plastic netting in order to avoid any perforation due to untimely impacts, on the contrary, the microporous hollow fibers, which are supple and therefore floating, do not need any support except for a simple outer protection consisting of the perforated tubular body of the cartridge.

Finally, taking into account the small internal diameter section of the microporous hollow fibers, which is of the order of about 300 micrometers (and their pore diameter which varies from 0.2 to 2 micrometers), the yeasts, which have a size of the order of 3 to 7 micrometers and which are introduced under pressure inside these fibers and line their inner walls, are less likely to decant and to aggregate on leaving these walls than in the cartridge which is the subject to U.S. Pat. No. 4,792,454. The cartridge according to the present invention therefore guarantees due to the presence of these small-diameter hollow fibers the maintenance of a good contact surface between the sugar-containing drink and the yeasts for the total fermentation period.

DESCRIPTION OF THE DRAWINGS

The present invention will now be described using the attached drawings and in which.

DETAILED DESCRIPTION OF THE INVENTION

Figure 1:
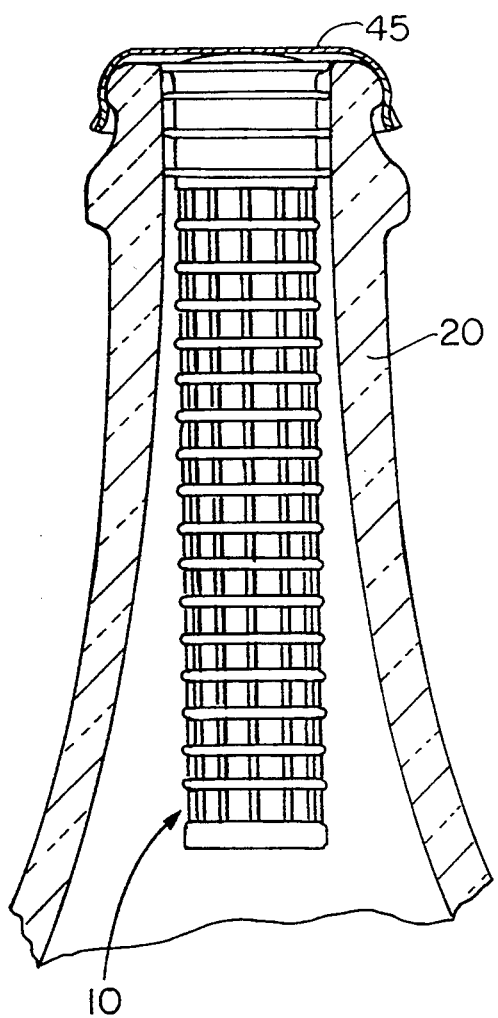
FIG. 1 represents a section along an axial plane of a filter cartridge according to the invention placed in the neck of a bottle.

A microporous hollow fiber cartridge 10 which is the subject of the present invention is shown in FIG. 1 threaded in the neck of a bottle 20 where it has been fixed by a crimped metal cap 45.

The cartridge 10 has a perforated tubular body 11 of generally cylindrical shape the lower end 12 of which is open and the open upper end of which comprises a cylindrical stopper part 13 which has lips 48 providing a seal in the neck of the bottle as the diameter of the lips are greater than that of the tubular body 11.

Figure 2:
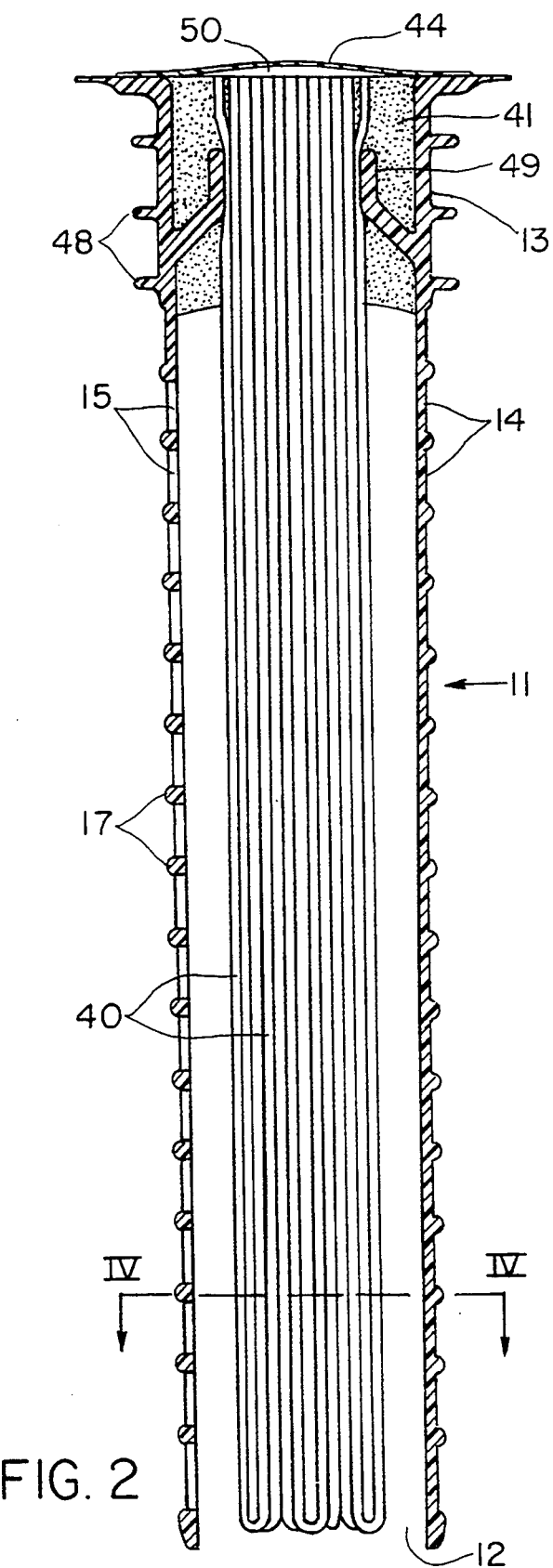
FIG. 2 represents a section along the line 2—2 of FIG. 4 of the filter cartridge of FIG. 1.
Figure 3:
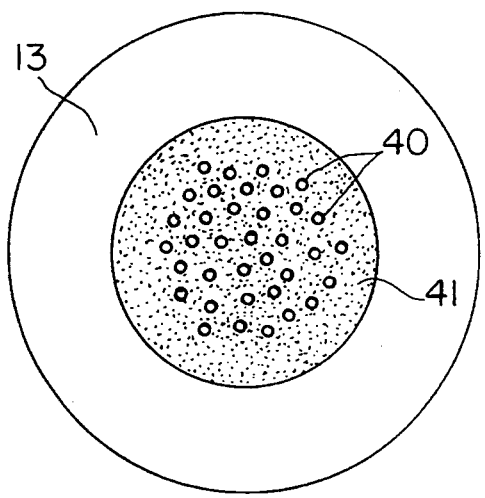
FIG. 3 represents a top view of the cartridge of FIG. 2, of which the plastic film which seals it has been removed in order to show the inside.
Figure 4:
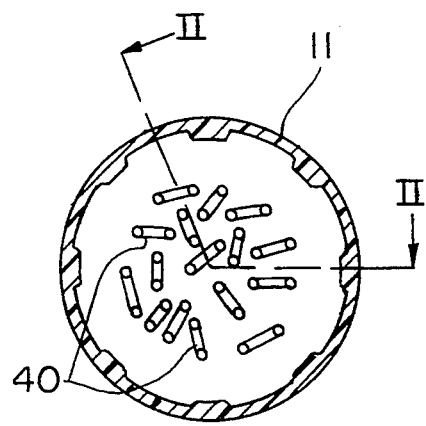
FIG. 4 represents a section along the line 4—4 of FIG. 2.

As shown in FIG. 2, the tubular body 11 is comprised of a series of outer grooves 14 and rings 17 which define perforations 15 which put the inside and the outside of the cartridge in contact with each other.

A plurality of microporous hollow fibers 40 are arranged inside the tubular body 11, where they are folded in a U shape, the base of which is situated near the open end 12 of the tubular body. The two parallel arms of this U-shaped arrangement extend axially the whole length of this body in order to emerge at the upper end of the cylindrical part 13.

The fixing of the hollow fibers 40 is carried out by introducing the fibers 40 folded in a U shape inside the body of the cartridge and sealing them with a plug 41 in the upper part 13 of the cartridge. The material used to form the plug 41 is preferably a heat-setting glue and not a normal glue of polyurethane or epoxy type. In fact, thermoplastic glues allow the manufacture of the cartridges according to the invention to be simplified by eliminating, on the one hand, the centrifugation stage necessary to distribute the glue among several components and, on the other hand, the polymerization stage.

After sealing with the material used for making the plug 41, the microporous hollow fibers 40 are maintained in place by the plug 41 which traps them by sealing them with each other and with the inner wall of the cylindrical stopper part 13.

A cylindrical lip 49, integrally formed and coaxial with the cylindrical part 13, and of a smaller diameter than it, provides the necessary seal around the bundle of fibers in case the material used for making the plug shrinks. It will be noted, as is shown in FIG. 2, that the part 13 and the lip 49 define a channel in the form of a crown which receives the material of the plug 41 so as to surround all the fibers 40 by a cylindrical crown of the plug material. The fibers can then be cut in a plane perpendicular to the axis of the cartridge and corresponding to the open upper end of the cylindrical part 13.

The microporous hollow fibers 40, which are available commercially from a variety of vendors such as Akzo N.V. and Mitsubishi Rayon Co. Ltd., consist of plastic fiber such as polyamides, polysulphones, polyethersulphones, polyesters such as cellulose triacetate and polyolefins such as polyethylene or polypropylene. They have an internal diameter of between 100 and 500 micrometers and an external diameter of between 200 and 600 micrometers. The pore diameter of 0.2 to 2 micrometers varies according to the nature of the polymer and the manufacturing process.

Figure 5:
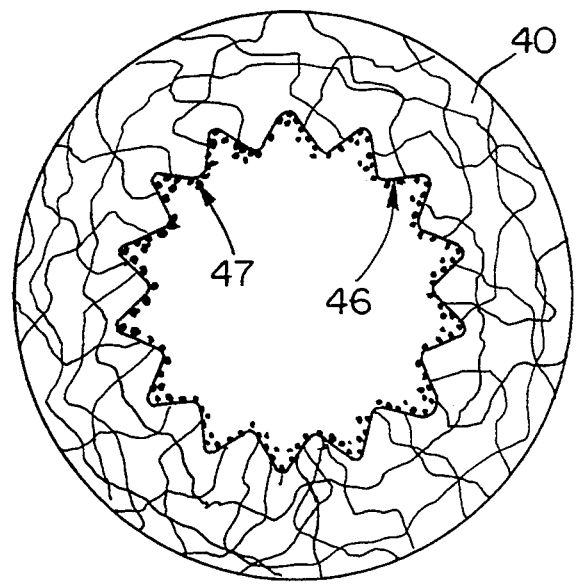
FIG. 5 represents a cross-sectional view of a specific embodiment of a microporous hollow fiber used in the cartridge according to the invention.

Preferably the cartridges according to the invention include microporous hollow fibers the inner surface of which has been modified so as to present longitudinal inner contours. As is shown for example in FIG. 5 the cross section of the fibers 40 includes inner contours 46 which can be crenellated or star-shaped. Such contours are obtained directly when the hollow fiber is extruded due to the special shape of the die, generally in the form of a needle, through which the fiber is extruded. These inner contours 46 improve the attachment of the yeasts 47 to the inner walls of the fiber and also allow the exchange surface area to be increased.

According to the implementation represented in FIG. 2, most of the hollow fibers are hydrophilic, one or more fibers being hydrophobic, which allows the carbon dioxide to be evacuated during the fermentation of the wine.

After the hollow fibers 40 have been filled with the leaven containing the appropriate yeast, the upper opening of the cylindrical part 13 is preferably closed by a plastic film 44 welded onto the upper surface of the part. The plastic film 44 as well as the special cut of the plug 41 cream a chamber 50 which permits communication between the inside of all the hollow fibers. Thus the carbon dioxide gas resulting from the yeasts situated in the hydrophilic fibers makes its way to the chamber 50 and is then evacuated into the wine in the bottle via the hydrophobic fibers.

In the absence of hydrophobic fibers the carbon dioxide gas can nevertheless be evacuated when its pressure is sufficiently high to pass through the hydrophilic fibers. However, such a rise in the pressure of the carbon dioxide gas inside the hydrophilic hollow fibers, which occurs after the start of fermentation, can be detrimental to the metabolism of the yeasts and tends to increase the time necessary for the bottle fermentation. To avoid these drawbacks, it is preferable but not essential that the cartridge 10 contains at least one fiber 40 which is partially or completely hydrophobic, and which is in communication with the exterior of the other hydrophilic hollow fibers.

When fermentation is finished and when the metal cap 45 holding the cartridge in the neck of the bottle is removed, the pressure existing inside the bottle and the cartridge, which can be of the order of $6 \times 10^5$ Pa, causes the cartridge to be ejected.

Figure 6:
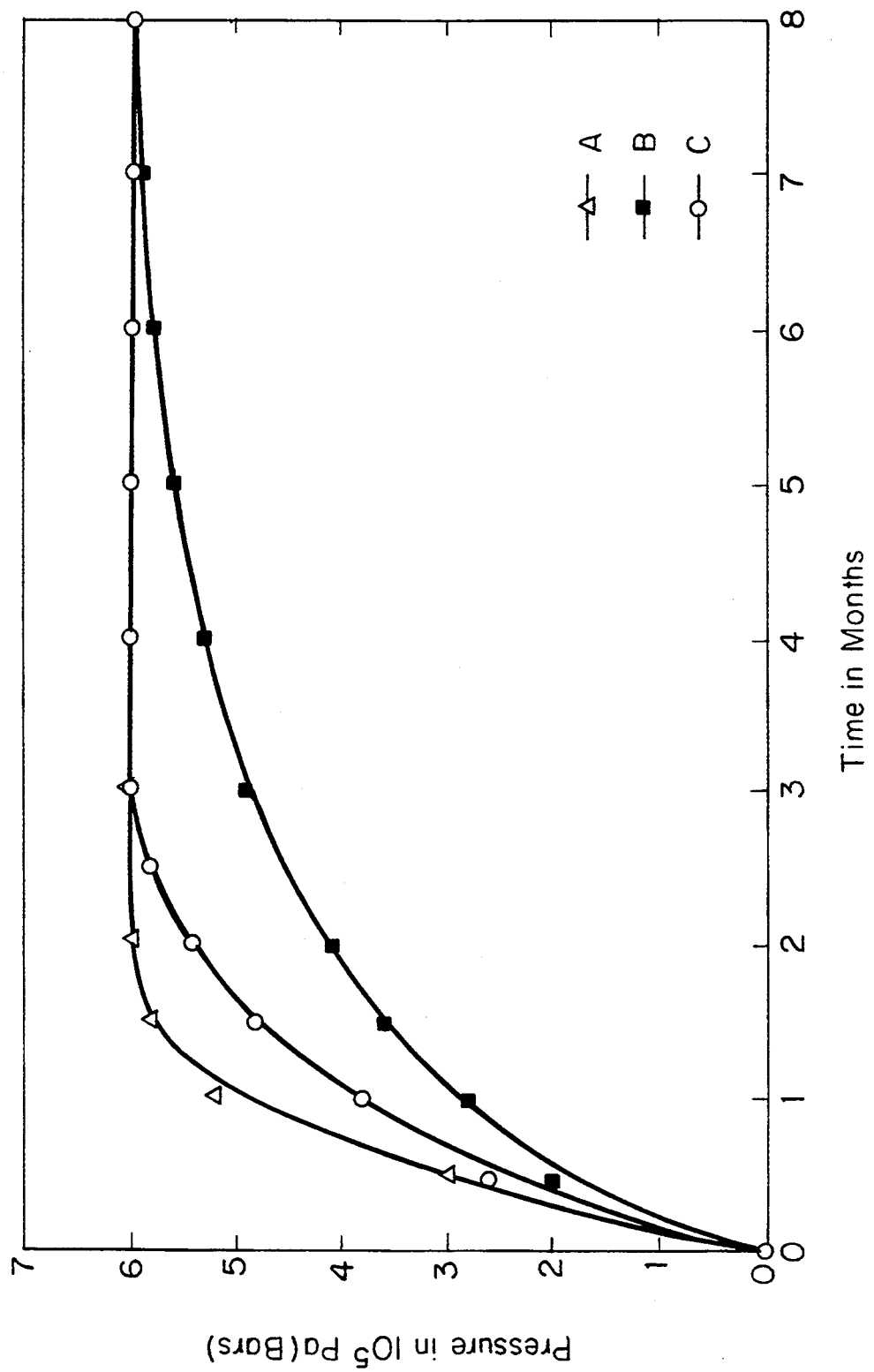
FIG. 6 represents the curves obtained by measuring the rise in pressure in bottles according to the traditional champagne method, first with a cartridge according to U.S. Pat. No. 4,792,454 and then with a cartridge according to the present invention.

FIG. 6 is a graph which shows the rise in pressure during bottle fermentation as a function of time in three bottle samples, each containing the same sugar-containing wine and each kept at a constant temperature of 13° C. The same number of yeasts, namely $10^9$ cells, originating from the same leaven were used in the three tests labeled A, B and C.

Curve (A) shows the results obtained with free yeasts according to the traditional method. Curve (B) shows the results obtained with cartridges of the type described in U.S. Pat. No. 4,792,454. Lastly, curve (C) shows the results obtained with cartridges equipped with hydrophilic and hydrophobic microporous hollow fibers filled with yeasts according to the present invention. The cartridge according to the invention used to obtain the results obtained for curve (C) contained 50 hydrophilic hollow fibers representing an exchange surface of about 100 cm$^2$ and a single hydrophobic hollow fiber of about 2 cm$^2$.

Comparison of these different curves show that the cartridges according to the present invention allow a pressure rise to be obtained which is clearly an improvement relative to that obtained with the cartridges according to U.S. Pat. No. 4,792,454 and which approaches that obtained according to the traditional method for champagne wines. In fact, on examination of FIG. 6, it should be noted that a bottle fermentation is obtained with a final pressure of $6 \times 10^5$ Pa (6 bars) after 3 months in the bottle with a cartridge according to the present invention, as opposed to the 8 months required with the cartridge according to U.S. Pat. No. 4,792,454.

Microporous tubular cartridges according to the present invention may be used for the first alcoholic fermentation of wine as well as for the second fermentation of wine in the bottle according to the traditional so-called "champagne" method. Such cartridges can also be used for the production of beverages other than wine, such as beer, cider and others, and in containers other than bottles such as barrels or vats.

The foregoing examples and description are not intended to be limiting as other modifications will become apparent to those of skill in the art without departing from the scope of the present invention as defined in the accompanying claims.

I claim:

1. A cartridge for fermentation comprising a perforated body, one or more microporous elements for retaining yeasts which cause the fermentation of a sugar-containing beverage, said microporous element being a microporous hollow fiber which is arranged inside said body and filled with said yeasts.

2. The cartridge according to claim 1 comprising a plurality of microporous hollow fibers, some of said fibers being either entirely hydrophilic or entirely hydrophobic.

3. The cartridge according to claim 1 comprising a plurality of microporous hollow fibers, each of said fibers being partially hydrophilic and partially hydrophobic.

4. The cartridge according to claim 2 wherein the microporous hollow fibers are retained by a plug made of a thermoplastic adhesive, said plug sealing the fibers together as well as sealing the bound fibers with the inner wall of the cartridge.

5. The cartridge according to claim 3 wherein the microporous hollow fibers are retained by a plug made of a thermoplastic adhesive, said plug sealing the fibers together as well as sealing the bound fibers with the inner wall of the cartridge.

6. The cartridge according to claim 4, including a stopper at one end of said cartridge, said stopper including an integral cylindrical lip, coaxial with said stopper and of a smaller diameter, adapted to ensure the seal of the plug around said fibers.

7. The cartridge according to claim 5, including a stopper at one end of said cartridge, said stopper including an integral cylindrical lip, coaxial with said stopper and of a smaller diameter, adapted to ensure the seal of the plug around said fibers.

8. The cartridge according to claim 1 wherein the microporous hollow fiber includes longitudinal inner contours.

9. The cartridge according to claim 4 wherein the microporous hollow fiber includes longitudinal inner contours.

10. The cartridge according to claim 1 wherein the perforated body is tubular and comprises two open ends, one of said ends having lips which seal the cartridge within the neck of a bottle.

11. The cartridge according to claim 6 wherein said stopper includes an open end, said open end sealed by a plastic film joined to said open end to create a chamber thereby allowing fluid communication between the individual microporous hollow fibers.

12. The cartridge according to claim 7 wherein said stopper includes an open end, said open end sealed by a plastic film joined to said open end to create a chamber thereby allowing fluid communication between the individual microporous hollow fibers.

* * * * *